US009513628B2

(12) United States Patent
Crepet

(10) Patent No.: US 9,513,628 B2
(45) Date of Patent: Dec. 6, 2016

(54) DEVICES AND METHODS FOR DIAGNOSIS OF ELECTRONIC BASED PRODUCTS

(71) Applicant: ALSTOM Technology Ltd, Baden (CH)

(72) Inventor: Gilles Crepet, Boissy-sous-Saint-Yon (FR)

(73) Assignee: General Electric Technology GmbH, Baden (CH)

( * ) Notice: Subject to any disclaimer, the term of this patent is extended or adjusted under 35 U.S.C. 154(b) by 547 days.

(21) Appl. No.: 14/024,831

(22) Filed: Sep. 12, 2013

(65) Prior Publication Data

US 2014/0074433 A1    Mar. 13, 2014

(30) Foreign Application Priority Data

Sep. 12, 2012    (EP) .................................... 12290300

(51) Int. Cl.
*G05B 23/02* (2006.01)
*G05B 19/048* (2006.01)

(52) U.S. Cl.
CPC ............. *G05B 23/02* (2013.01); *G05B 19/048* (2013.01)

(58) Field of Classification Search
CPC ....... G05B 23/02; G05B 19/048; G06F 11/00; G06F 11/07; G06F 11/30; G06F 11/3058
See application file for complete search history.

(56) References Cited

U.S. PATENT DOCUMENTS

| 5,623,579 A | 4/1997 | Damiano et al. |
| 6,460,013 B1 * | 10/2002 | Nippes ................ G01R 31/343 |
| | | 702/183 |
| 7,328,130 B2 | 2/2008 | Wiles et al. |
| 7,630,802 B2 | 12/2009 | Breed |
| 2008/0244329 A1 | 10/2008 | Shinbo et al. |
| 2008/0306650 A1 | 12/2008 | Nakagaki |

FOREIGN PATENT DOCUMENTS

| CN | 102323806 A | 1/2012 |
| CN | 102591300 A | 7/2012 |
| GB | 2274540 A | 7/1994 |
| RU | 2363029 C2 | 7/2009 |
| TW | M289142 U | 4/2006 |
| WO | 97/28574 A1 | 8/1997 |

* cited by examiner

*Primary Examiner* — Toan Le
(74) *Attorney, Agent, or Firm* — John A. Kramer; Global Patent Operation

(57) ABSTRACT

A device for diagnostic of an electronic based product includes a plurality of sensors for monitoring parameters associated with product. Each sensor generates at least one of an analog signal and a digital signal upon monitoring of a parameter. The device further includes a plurality of converters for converting analog signals to digital signals, a processing module for determining abnormal parameter conditions based on comparing digital signals to threshold parameter values. Each abnormal parameter condition corresponding to a parameter is determined based on comparison of a digital signal associated with the parameter and a threshold parameter value corresponding to the parameter. The device further includes a memory module configured to store information associated with the abnormal parameter conditions, and a communication interface to provide the information to external devices for diagnosis of the product.

14 Claims, 4 Drawing Sheets

DEVICES AND METHODS FOR DIAGNOSIS OF ELECTRONIC BASED PRODUCTS

CROSS-REFERENCE TO RELATED APPLICATIONS

This application claims priority to European Application 12290300.8 filed Sep. 12, 2012, the contents of which are hereby incorporated in its entirety.

TECHNICAL FIELD

The present disclosure relates to diagnosis of various electronic based products deployed in industrial plants and processes.

BACKGROUND

Monitoring and diagnosis of industrial systems and processes is an important phenomena as manufacturers strive to improve quality, increase production and reduce costs. Such monitoring usually aims to diagnose faults in various components of the industrial systems. Monitoring of industrial systems and its components involves measuring various environment variables, process variables and physical data related to the components of the industrial systems. Industrial systems are designed to employ various monitoring systems for monitoring operation of components within the industrial systems. Based upon information provided by the monitoring systems, corrective action may be taken to protect the integrity of industrial systems, when one or more components of the industrial systems indicate failure in their operation.

Monitoring of modern industrial systems and processes include deploying external monitoring systems that measure and record physical and environmental data related to the components of the industrial systems. An exemplary monitoring system comprises sensing means coupled with monitored components in order to generate signals, which represent the condition of the monitored components. The monitoring system also comprises at least one external control station that is configured to receive signals from one or more monitored components and perform diagnosis of the received signals to identify any fault in the monitored components. Such exemplary monitoring systems utilize separate instruments, which are not capable of being coupled easily to the monitored components, in case of monitored components being electronic based products, as such instruments tend to interfere with normal functioning of the electronic based products. Further, these monitoring systems may be costly in their implementations.

Accordingly, due to the risk of perturbation of industrial processes involving the electronic based products caused by the external monitoring systems, and the costly implantation of the external monitoring systems, such monitoring systems may not be suitable for application within the electronic based products.

SUMMARY

The following presents a simplified summary of the disclosure in order to provide a basic understanding of one or more aspects of the disclosure. This summary is not an extensive overview of the disclosure. It is intended to neither identify key or critical elements of the disclosure, nor to delineate the scope of the present disclosure. Rather, the sole purpose of this summary is to present some concepts of the disclosure in a simplified form as a prelude to the more detailed description that is presented hereinafter.

An object of the disclosure is to provide a mechanism for performing a real-time diagnosis/analysis of faults in electronic based products deployed in industrial plants/systems and processes. Another object of the disclosure is to provide autonomous devices for monitoring and diagnosis of the electronic based product that can be integrated with the electronic based products and operate without interfering with the functioning of the electronics based products. Another object of the disclosure is to provide preventive maintenance of the electronic based products even before the occurrences of faults in the electronic based products. Still another object of the disclosure is to check authenticity of claims made for replacement/repair of the electronic based devices under a warranty agreement.

The above noted and other objects may be achieved by a device for diagnosis of an electronic based product, the device comprising a plurality of sensors coupled with the electronic based product for monitoring a plurality of parameters associated with the electronic based product, each sensor configured to generate at least one of an analogue signal and a digital signal upon monitoring of a parameter; a plurality of converters for converting analogue signals associated with the plurality of parameters to digital signals; a processing module coupled with the plurality of converters for determining abnormal parameter conditions based at least on comparing the digital signals to threshold parameter values, each abnormal parameter condition corresponding to a parameter being determined based on comparison of a digital signal associated with the parameter and a threshold parameter value corresponding to the parameter; a memory coupled with the processing module, the memory configured to store the abnormal parameter values; and a communication interface to provide the abnormal parameter values to at least one external device for, diagnosis of the electronic based product, wherein the device is configured in a hosting module of the electronic based product. In an embodiment, the abnormal parameter condition may also be determined from one or more of comparison of the digital signals to the threshold values, abnormal gradients, abnormal combination of the digital signals, and internally computed values (from a set of sensors, a mathematical model and/or an analytical computation).

In an aspect, the device includes a processing system, which is at least one of an Application Specific Integrated Circuit (ASIC), a System on Chip (SOC), a micro-controller Unit (MCU), a Digital Signal Procession (DSP), an Electrically Programmable Logic Device (EPLD), Complex Programmable Logic Device (CPLD), system of discrete components, hybrid systems and a Field Programmable Gate Array (FPGA) system. The processing system includes one or more logic modules for controlling the plurality of sensors and the plurality of converters. The processing module may also be configured in the processing system that may be embodied in the hosting module of the electronic based product. In an aspect, the hosting module is at least one of a circuit board of the electronic based product, a backplane of the electronic based product, a Central Processing Unit (CPU) of the electronic based product and an Input/Output (I/O) module of the electronic based product, partially or totally ensured by one or more parts of the electronic based product, a single board of the electronic based product, a main board of the electronic based product and a daughter board of the electronic based product. In an aspect, the memory of the device is configured to store information associated with the abnormal parameter conditions with corresponding timestamp information.

An advantage of the device disclosed in the present disclosure is precisely diagnosing the parameter, which is the cause of a fault in the electronic based product based on the timestamp information. As the abnormal parameter conditions corresponding to various parameters are time tagged, an occurrence of a fault in the electronic based product can be precisely linked to one or more parameters.

In an aspect, the device disclosed in the present disclosure is capable of monitoring a variety of environmental and operating parameters such as a voltage difference between 0 Volt and ground potential, power supply monitoring, an ambient temperature where the electronic based product is deployed, accelerations, shocks and vibrations associated with components of the electronic based product, shocks and vibration on a cubicle where the electronic based product is deployed, a power supply fed to the electronic based product, electro-magnetic disturbance in an ambience of the electronic based product, opening/closing of one or more doors of the cubicle, temperature of the electronic based product, humidity in ambience of the electronic based product, pressure, altitude, angle of orientation from vertical and horizontal, geo-localization, light and brightness level, noise level, radiations level, pollution level, gas level, fumes and particles presence level, a number of transitions and duration of ON/OFF of the power supply, and logic inputs to monitor one or more subjects placed in a proximity to the electronic based product.

In another aspect, the disclosed device is configured to transmit the abnormal parameter conditions to part of the electronic based product (like the Central Processing Unit (CPU) of the electronic based product and its associated communication means) or to an external device such as a communication device of maintenance engineers and a local station (for example, a Universal Serial Bus (USB) key, a USB disk, a Personal Computer (PC), a tablet, a smart phone and/or a pocket terminal) or central control station to achieve the advantage of scheduling maintenance or conducting preventive maintenance of the electronic based product.

In another aspect, the processing module of the disclosed device is further configured to compute time duration associated with the parameters, and count a number of occurrences of at least one parameter to achieve the advantage of accurately storing information associated with the abnormal parameter conditions, thereby enabling accurate diagnosis of the faults in the electronic based products. The processing module is further configured to compute a mathematical modelling associated with a parameter based on at least one of the time duration associated with the parameter, the number of occurrences of the parameter and historical information associated with the parameter. The processing module is further configured to determine the abnormal parameter condition based on at least one of a comparison of the digital signals to the threshold parameter values, the time duration associated with the parameter, the number of occurrences of the parameter, and the mathematical modelling.

The above noted and other objects are also achieved by a method performed at a device for diagnosis of an electronic based product, the method comprising: sensing a plurality of parameters associated with the electronic based product, wherein sensing of a parameter is performed to generate at least one of an analogue signal and a digital signal associated with the parameter; converting analogue signals associated with the plurality of parameters to digital signals; determining abnormal parameter conditions associated with the plurality of parameters based at least on comparison of each digital signal associated with a parameter to a threshold parameter value corresponding to the parameter; and storing information associated with the abnormal parameter conditions corresponding to the plurality of parameters; the device configured in a hosting module of the electronic based product. The method further includes transmitting the information associated with the abnormal parameter conditions to at least one external device for the diagnosis of the one or more faults in the electronic based product.

Advantageously, technical aim of various embodiments of the devices and methods is to diagnose faults in the electronic based products (deployed in industrial systems and processes) caused by external interventions, perturbations, environmental conditions, and out of rated operating conditions, operating profile/cycling and mission profile associated with the electronic based products. The disclosed devices and methods are capable of diagnosing failure, malfunctions in the electronic based products, and facilitate in anticipating preventive maintenance for the electronic based products. Certain embodiments are configured to store the information about external interventions, malfunctions, environmental conditions along with corresponding timestamp, thereby enabling support/maintenance team to realize the right level of diagnosis of the faults and realize in a shorter time the appropriate maintenance action to be taken. Various embodiments of the devices and methods are configured to store relevant information if the product has been used under out of rated/specified operating conditions, and such information may be used to decide authenticity of claims made for replacement/repair of the electronic based products under a warranty agreement. Further, the devices and methods are capable of being integrated/operated in the electronic based products without causing any interference with the functions of the electronic based products.

Further objects, advantages and features of the present disclosure will be apparent from the following detailed description and claims.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION

Figure 1:
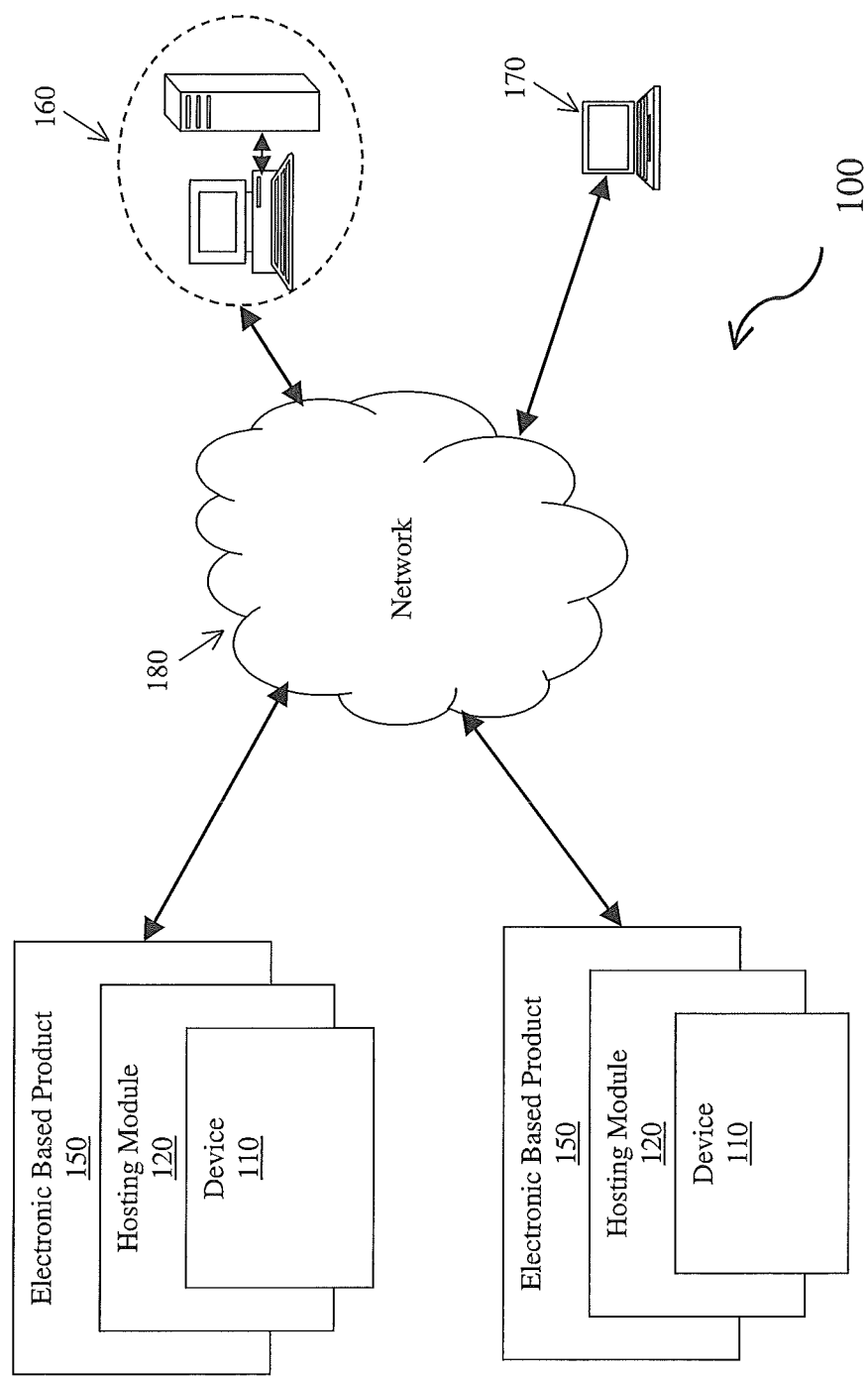
FIG. 1 illustrates an environment representing electronic based products, devices for diagnosis of faults in the electronic based products, and external devices, in accordance with an exemplary embodiment of the present disclosure.

In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Broadly, embodiments of the present disclosure disclose devices and methods for diagnosis of faults in electronic based products used in industrial systems and processes. The devices and methods provide mechanism for monitoring and storage of information about external interventions, malfunctions, environmental conditions, operating profile/cycling and mission profile associated with the electronic based products. Various embodiments of the devices and methods are further capable of diagnosing failure, malfunctions in the electronic based products, and facilitate in anticipation of preventive maintenances for the electronic based products. For instance, the devices and methods are capable of providing instant access to information related to continuous monitoring of the electronic based products for helping in identifying faults in the electronic based products even before occurrence of faults in the electronic based products. Certain embodiments are configured to store the information about external interventions, malfunctions, environmental conditions, operating profile/cycling and mission profile along with corresponding timestamp for enabling support/maintenance team to realize the right level of diagnosis and realize in a shorter time the appropriate maintenance action to be taken. Various embodiments of the devices and methods provide mechanism for storing relevant information if the product has been used in out of rated/specified operating conditions, and same may be used to authenticate claims for replacement of products under a warranty agreement.

FIG. 1 illustrates an environment 100 including electronic based products, devices for diagnosis of electronic based products and external devices, in accordance with an embodiment. The environment 100 represents devices 110 coupled with electronic based products 150. A device 110 is coupled with an electronic based product 150, and is configured to monitor a plurality of parameters associated with the environmental/ambient data, operating data and process variables related to the product 150. The device 110 is also configured to facilitate diagnosis of faults in the product 150 based on the monitored parameters, and is configured to facilitate scheduling of preventive maintenance of the product 150 based on the monitored parameters. Herein, the term fault refers to any state of the product 150 that include any kind of failure, hazards, malfunction or defect in the product 150 that may hinder a normal functioning of the product 150, or a state in which the product 150 may not be safe to operate. The term 'fault' is used throughout the description (interchangeably with other equivalent terms) in reference to the above noted states of the product 150.

The device 110 may be configured or embodied in a hosting module 120 in the product 150. Examples of the hosting module 120 may be a Printed Circuit Board (PCB) that can be coupled closely or embedded in the product 150. For example, in some embodiments, the hosting PCB may be embodied in one of a circuit board of the product 150, a backplane of the product 150, a central processing unit (CPU) of the product 150 or an Input/Output (I/O) module of the product 150. Examples of the circuit board of the product 150 may include a dedicated board of the product 150, a single board such as a main board or a daughter board of the product 150.

Examples of the product 150 may be a static electronic based product, an electronic based product deployed in an apparatus in motion, or electronic components placed in boards, racks, boxes, cabinets, and the like. For example, electronic products such as, controllers, computers, gateways, regulators, governors, monitoring and diagnostic electronic systems, electronic protection systems, electronic relays, power electronic systems, transmission systems, measurement systems, and the like, that are used in any industrial plant, factory, machinery or refinery, may be examples of the product 150. More specifically, the product 150 may be an electronic based product used in various industrial domains, non-exhaustively including, power plants, grid, transport, mining plants, plants related to petrochemical industrial applications, ore, fuels, paper, agro-food, mechanics, avionics, and the like. Some examples of the electronic based products in the power plant domain (for fuels types such as hydro, nuclear, thermal, renewable, wastes, and the like) may include Distributed Control Systems (DCS), controllers, regulators, monitoring and diagnostic products, and power electronic products. Further, some examples of the electronic based products in the grid may include Supervisory Control and Data Acquisition (SCADA), controllers, electronic relays, protection products, measurement products and communication products. Further, some examples of components in the transport domain may include signalling products (static), on-board train and metro products.

The device 110 is communicably coupled, permanently or occasionally (for example, after a fault is detected in the product 150) to a local or central control station 160 or one or more communication devices 170 of maintenance engineer(s) or technician(s), through a network 180. The control station 160 may be a local or a central control station. The control station 160 and the communication device 170 may be capable of receiving and sending information about the monitored parameters with the devices 110. Examples of the network 180 may include wired networks, a fixed or removable cable, wireless networks or combinations (for example, Internet) thereof. Examples of wired network may include Ethernet, Local Area Network (LAN) and the like. Examples of wireless network may include Wi-Fi network, cellular network, Wireless LANs, and the like.

The device 110 is configured to monitor and diagnose various parameters related to the product 150. Example of the parameters may include environmental/ambient parameters, where the product 150 is deployed, operating parameters associated with the product 150, and process variable associated with the product 150. The parameters related to the product 150 may be associated with the entire product 150 or various components of the product 150. Some non-exhaustive examples of the parameters are provided below that are monitored by the device 110:

1. Voltage difference between 0 Volt (V) and ground potential
2. Ambient temperature where the product 150 is deployed
3. Accelerations, shocks and vibrations associated with components of the product 150 that are static or in motion
4. Shock and vibration on a cubicle where the product 150 is deployed
5. Power supply fed to the product 150
6. Electro-magnetic perturbation in an ambience of the product 150
7. Opening/closing of one or more doors of the cubicle or box, where the product 150 is deployed
8. Temperature of the product 150
9. Humidity in the ambience
10. Pressure
11. Altitude
12. Angle of orientation from vertical and horizontal
13. Geo-localization
14. Light and brightness level
15. Noise level
16. Radiations level, for example, alpha, beta, gamma, and the like
17. Pollution level
18. Gas presence level in the ambience
19. Fumes and particles presence level in the ambience
20. Number of transitions and duration of ON/OFF of power supply
21. Logic inputs to monitor one or more subjects placed in proximity to the product 150
22. Independent watchdog The device 110 is configured to diagnose failure in the product 150 based on the monitored parameters and is configured to support client claims for replacement/repair of the device 110 under warranty agreement. The device 110 is further configured to facilitate in anticipating and scheduling preventive maintenance or providing recommendations concerning operating conditions to a user of the product 150. These are further explained in reference to FIGS. 2 and 3.

Figure 2:
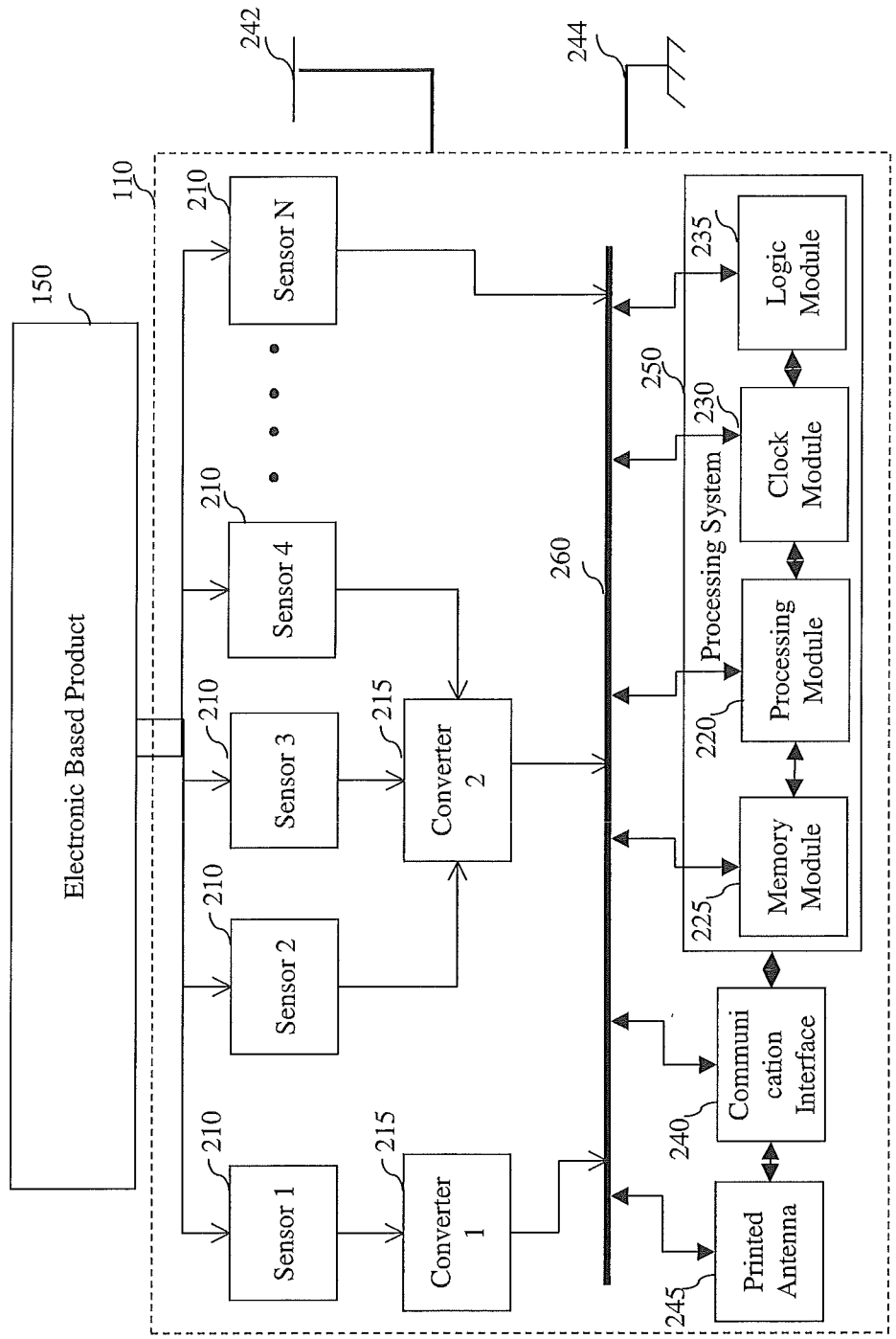
FIG. 2 illustrates a block diagram representation of a device for diagnosis of faults in an electronic based product, in accordance with an exemplary embodiment of the present disclosure.

Referring to FIG. 2, there is shown a block diagram of a device (such as the device 110) for diagnosis of an electronic based product (such as the product 150) in accordance with an embodiment of the present disclosure. The device 110 includes a plurality of sensors 210 (for example, sensor 1, sensor 2 . . . , sensor n) for monitoring of parameters (provided in reference to FIG. 1) associated with the product 150. Some examples of the sensors 210 may be analogue sensors, while some examples of the sensors 210 may be digital sensors. Typically, analogue sensors are utilized for monitoring majority of the parameters. However, in some examples, for monitoring parameters such as whether the doors of the cubicle (whether the product 150 is deployed) is closed or not, a digital sensor may be utilized. Moreover, some parameters, such as humidity, pressure, altitude, light/brightness level, noise level, may be monitored by any of the digital or analogue sensors. Herein, the term 'monitoring' of a parameters refers to sensing, detecting or measuring of parameters at various sample frequencies to generate analogue or digital signals that correspond to a state, condition, or value associated with the parameters, and the primary objective of the monitoring is to generate a signal that corresponds to a state, condition, or value associated with the particular parameter.

The sensors 210 may be configured such that they perform either a periodic or a continuous monitoring of a parameter. For instance, a parameter that changes (or evolves) at a faster rate may be monitored continuously, whereas a parameter changing at a relatively slower rate may be monitored periodically (at intervals). Examples of the parameters that required continuous measurement may include, but not limited to, power supply fed to the product 150; accelerations, shocks and vibrations; detection of opening/closing of the cubicle doors; Electro-magnetic (EMC) perturbations/interferences/disturbances; and the like. Examples of the parameters that require periodic measurements may include, but are not limited to, temperature, humidity, pressure, and the like. However, I/O (Input/Output) subsystem of the device 110, calculation capacity and information storage capacity of the device 110 may also determine how often a parameter can be monitored.

The device 110 includes converters 215 to convert the analogue signals generated by the sensors 210 into digital signals. In an example, these converters may be analogue to digital converters (ADCs). There may be multiple converters 215 that correspond to their respective sensors 210 and are coupled with the respective sensors 210 for converting the analogue signals (received from the respective analogue sensors 210) into the digital signals. It should be noted that some parameters may be monitored by the digital sensors (for example, the sensor N), and the converter 215 will not be required in such cases. In some examples, some parameters are not required to be monitored in a continuous manner (rather these parameters are monitored in a periodic manner), a single converter 215 may be sufficient to convert analogue signals received by such multiple sensors into digital signals. In such examples, a switch or a multiplexer may be used to receive signals from multiple sensors and provide its output to a converter 215. It should be understood that by the usage of the switch or the multiplexer, the number of required converters such as the ADCs are reduced. For instance, a converter 215 may be configured to receive analogue signals from multiple sensors 210 in a time division multiplexed manner, and then convert the analogue signals into digital signals. For instance, as shown in FIG. 2, the sensors 2, 3, and 4 are coupled to a single converter 215. Such coupling of multiple sensors to a single converter 215 is further explained in reference to FIG. 3.

In an embodiment, the device 110 is configured to determine abnormal parameter conditions corresponding to the parameters based on the digital signals (or values) received from the converters 215 or the sensors 210. The device 110 may include a processing module 220 to determine the abnormal parameter conditions. The processing module 220 may have an internal or accompanying memory for storing instructions that are executable by the processing module 220, and for storing the information associated with the abnormal parameter conditions. The processing module 220 may be configured in a processing system 250. The processing system 220 may be an Application Specific Integrated Circuit (ASIC), a System on Chip (SOC), a Microcontroller Unit (MCU), a Digital Signal Procession (DSP), an Electrically Programmable Logic Device (EPLD), Complex Programmable Logic Device (CPLD), system of discrete components, hybrid systems, and a Field Programmable Gate Array (FPGA) system. In an embodiment, the processing system 220 may be embodied in a hosting system such as the hosting system 120 of the product 150.

The processing module 220 is configured to determine the abnormal parameter conditions based at least on comparing digital signals (parameter values) against a plurality of threshold parameter values. In an example, each parameter may have one or more threshold parameter values, for example, a minimum specified value of the parameter and a maximum specified value of the parameter. In an example, if a digital signal associated with a parameter, such as the ambient temperature, represents an ambient temperature of 392 Fahrenheit (° F.), and if a threshold parameter value for the ambient temperature is 280° F., the measurement of 392° F. is determined as an abnormal parameter value and hence an abnormal parameter condition is also determined. Similarly, other digital signals associated with various parameters are compared against their corresponding threshold parameter values to determine the abnormal parameter conditions, in a continuous manner. In some examples, the threshold parameter value may also include a pre-determined gradient. In such examples, a gradient of measurement values (digital values) for a parameter is compared against a pre-determined gradient corresponding to the parameter, to determine the abnormal parameter condition corresponding to the parameter.

In some embodiments, the processing module 220 is configured to determine the abnormal parameter conditions based on any combination of parameters values (digital signals) provided by the sensors 210 and/or converters 215, and mathematical analysis and/or modelling based on monitored information associated with the parameters. For example, the processing module 220 may be configured to compute the abnormal parameter condition for a parameter based on a time duration associated with the parameter; a number of occurrences of the parameter; and a mathematical modelling and/or analysis related to the time duration, the number of occurrences and a comparison of the time duration and number of occurrences to corresponding historical archived data. The processing module 220 may be configured to compute a time duration for which a parameter has continuously been monitored as having abnormal parameter values. In an example, the processing module 220 may compute a time duration for which a parameter (such as the ambient temperature) has remained higher than a threshold parameter value (an optimum temperature), and if it is determined the ambient temperature has remained higher than the optimum temperature for a period of more than a threshold duration, the abnormal parameter condition may be determined for the ambient temperature parameter. In another example, the processing module 220 may compute a time duration for which the product 150 has been in continuous ON state, and if the product 150 has been in continuous ON state for more than a threshold time period, the abnormal parameter condition may be determined.

Further, the processing module 220 may also be configured to count a number of occurrences for some parameters. For examples, the processing module 220 may count a number of times of ON/OFF transition of the power supply fed to the product 150, during a certain period of time. In certain examples, the processing module 220 may count the number of occurrences over the whole life cycle of the product 150. Moreover, the processing module 220 is configured to compute cumulated occurrences of an abnormal condition corresponding to a parameter, or a total duration of the occurrence of the abnormal condition over the product life cycle, and such computational information may be stored in the memory module 225.

Accordingly, it should be understood herein that the 'abnormal parameter condition' may include conditions/states where an abnormal parameter value is determined corresponding to a parameter by the device 110. In some examples, the 'abnormal parameter condition' may include conditions/states where an abnormal parameter value is determined for a certain continuous period of time. In some further examples, the 'abnormal parameter condition' may include conditions/states where a number of occurrences of the abnormal parameter value exceeds a threshold number. In certain examples, the abnormal parameter condition' may include a combination of condition/states associated with the determination of the abnormal parameter value, determination of the abnormal parameter value for a certain continuous period of time and/or the number of occurrences of the abnormal parameter value exceeding the threshold number. Further, the processing module 220 may be configured to perform certain mathematical operations, modelling and/or analysis based on the abnormal parameter values, the time durations associated with the abnormal parameter values, the number of occurrences associated with the abnormal parameter values, and archived historical data related to the corresponding parameters. Based on such mathematical operations, modelling and/or analysis, the abnormal parameter conditions may be determined in certain embodiments.

The processing module 220 may be embodied in a number of different ways. The processing module 220 may be embodied as one or more of various processing means in the processing system 250. Examples of the processing means may include a coprocessor, a microprocessor, discrete components, a micro-controller, a digital signal processor (DSP), processing circuitry with or without an accompanying DSP, or various other processing devices including integrated circuits such as, an ASIC, an FPGA, an EPLD, CPLD, an MCU, an SOC, system of discrete components, hybrid systems and/or the like. The processing module 220 may have an internal or accompanying memory for storing instructions that are executable by the processing module 220. The processing module 220 may be capable of performing operations according to various embodiments such as performing modeling and data mathematical analysis for the determination of the abnormal parameter conditions and performing other diagnosis and analytical operations. In some embodiments, the processing module 220 may be a CPU of the product 150 and is communicably coupled to the sensor 210 and/or converters 215, and is capable of determining abnormal parameter conditions, performing other diagnosis, analysis operations. The processing module 220 may also be configured to perform functions such as storage, archiving and display of curves, historian, alarm list, associated with the parameters.

The device 110 further includes a memory module 225 to store information associated with the abnormal parameter conditions. In an example, the information may be the monitored data (abnormal parameter values) received from the processing module 220. Additionally, the memory module 225 may also store the digital signals corresponding to the parameters in a temporary or a permanent manner. In some examples, the memory module 225 may also store the instructions executable by the processing module 220. The memory module 225 may be a non-volatile memory. Some examples of the non-volatile memory may include, but are not limited to, programmable memory, erasable programmable memory, electrically erasable programmable memory, flash memory, hard disk, magnetic memory, any new non-volatile technologies and the like. In an example, the memory module 225 may be configured to store the monitored data (digital values) in a temporary manner, and the monitored data may be provided to the processing module 220 for the determination of the abnormal parameter conditions. As the abnormal parameter conditions associated with various parameters are determined, the corresponding information (for example, abnormal parameter values) is stored in the memory module 225 in a permanent manner or for a pre-determined time duration or in a FIFO (First In First Out). For instance, the abnormal parameter values may be stored in the memory module 225 for a period of more than 10 years. In some examples, the memory module 225 may not be present in the device 110 and the abnormal parameter values may be communicated to the CPU of the product 150 that may ensure the storage of the abnormal parameter values in a memory in, or otherwise accessible to, the product 150. In an example, the abnormal parameter values corresponding to the parameters are stored with timestamp information in the memory module 225 of the device 110. In this example, the device 110 may include a clock module 230 for providing timestamp information. In an example, the clock module 230 may be coupled with or otherwise embodied in the processing module 220 to provide the timestamp information for the storage of the information corresponding to the abnormal parameter conditions.

In some examples, the processing system 250 includes one or more logic modules to handle to requisite functions related to sensors 210. For instance, the processing system 250 is shown to include a logic module 235 to operate/control the sensors 210. The logic module 235 may also be configured to control operations of the converters 215 with objective to decrease cost and space. In some embodiments, the converters 215 may also be configured in the processing system 250.

The device 110 includes a communication interface 240 to provide the stored information associated with the abnormal parameter conditions to one or more external devices (for example, components 160 and 170 in FIG. 1). For example, the information such as the abnormal parameter values may be transmitted to the communication device 170 of the maintenance engineer, and/or the control station 160. In some case, the information such as monitored digitals signal (even if it is not an abnormal parameter value) may be transmitted to the communication device 170 and/or the control station 160. The communication interface 240 may be configured in a variety of ways. The processing system 250 may include a logic module (for example, the logic module 235) to control the communication interface 240. In certain examples, the communication interface 240 may also be configured in the processing system 250. The communication interface 240 may include a transceiver for a one-way or two-way data communication between the device 110 and the communication device 170 and/or the control station 160. It is to be understood that there can be many more elements present to enable communication among various devices. For example, the communication interface 240 may be coupled to a network link that can be connected to a local network. Some examples of the communication interface 240 may include a modem, a local area network (LAN) card, a wireless LAN card, or a Bluetooth interface or a Wide Area Network (WAN). In any such implementation, the communication interface 240 sends and receives electrical, electromagnetic or optical signals that carry digital data streams representing various types of information.

The device 110 further includes a printed antenna 245 that can be configured in a Printed Circuit Board (PCB). The printed antenna 245 is configured to detect the EMC perturbations/interferences/disturbances. The device 110 may have high impedance connections to a power supply 242 and ground 244.

The device 110 is configured to diagnose any fault in the product 150 without other monitoring information to support diagnostic of the product 150. For example, the abnormal parameter values associated with various parameters are stored with timestamp information in the device 110. As abnormal parameter values corresponding to various parameters are time tagged, an occurrence of a fault in the product 150 may be precisely linked to one or more parameters. For instance, some examples of occurrence of faults such as perturbation/trip may be due to trip or issues related to an environment constraint higher than standards, lightning on site, client power feeders failure (short power loss), inacceptable EMC perturbation close to the cubicle, opening of the cubicle door for an extended period of time with perturbations around, shock or vibrations on cubicle, client air conditioning issue (high temperature, high humidity, radiations or high pollution), and the like. As the abnormal parameter values corresponding to these parameters are stored with timestamp information, a parameter may be diagnosed that is the cause of occurrence of the perturbation/trip in the product 150. For example, a timestamp information of an abnormal parameter value may be matched to a time of occurrence of the perturbation/trip of the product 150 to diagnose the parameter (corresponding to the abnormal parameter value) that has caused the perturbation/trip. Further, the occurrence of the fault and the cause of the fault (the diagnosed parameter) may then be communicated to the communication device 170 and/or the control station 160.

The device 110 is further configured to facilitate in authenticating any claims made for replacement or repair of the product 150 under a warranty agreement, based on determining whether the product 150 has been used under specified/rated operating conditions (as per the product specifications) or not. If the product 150 is used under out of rated operating conditions, some abnormal parameter values corresponding to one or more parameters are automatically stored in the device 110 with timestamp information. Accordingly, if it is determined that the product 150 has been used under out of rated operating conditions, a claim made under warranty agreement for the replacement of the product 150 may be rejected. Some examples of the out of rated operating conditions include, but are not limited to, the power supplies being beyond permissible range, repetitive ON/OFF of the product 150, shock and vibrations more than an acceptable level, operating the product 150 in an ambient temperature greater than an optimum recommended temperature, huge discharges (electrostatic, lightning, and the like), opening of the cubicle door (where the product 150 is deployed) for an extended period of time in an armful environment (for example, radiations present nearby the product 150).

The device 110 is further configured to facilitate anticipating/scheduling of preventive maintenance without any other information on operating profile of the product 150. For instance, if the device 110 determines that the product 150 is being operated in a higher ambient temperature than the optimum ambient temperature, an abnormal parameter condition for the ambient temperature is determined. In such case, the device 110 may notify about such abnormal ambient parameter condition and a preventive maintenance may be scheduled accordingly. Similarly, if an out of range power supply is fed to the product 150, an abnormal parameter condition for the power supply is determined. Accordingly, the device 110 may notify such abnormal parameter condition and a preventive maintenance may be scheduled accordingly. Some other examples where a notification for the preventive maintenance may be generated include, usage of the product in an ambient temperature (that is higher than the optimum ambient temperature) for more than a threshold duration, the number of ON/OFF transition of the power supply being higher than a threshold number, opening of the cubicle doors for more than a threshold time duration in the presence of radiations, and the like. In another example, if a pollution level becomes higher than a threshold level, the device 110 may generate a notification for the preventive maintenance, such as filters to be cleaned or changed, performing air conditioning maintenance, and repairing any leeks in circuit(s) in the product 150 or in its environment. Moreover, in case of a permanent or occasional electrical fault in the product 150, a notification for the preventive maintenance may be generated. Accordingly, in case of determination of any other abnormal parameter condition, the device 110 facilitates in anticipating and scheduling the preventive maintenance.

The device 110 is configured to provide relevant information to the communication device 170 of the maintenance engineer when a critical situation is prolonging (for example, ambient temperature being higher than the optimum ambient temperature for more than the threshold duration) and/or if a preventive maintenance is required in case of determination of the abnormal parameter conditions. In certain examples, a notification may also be generated in form of a signal or sound from Light Emitting Diode (LED) or any other alarming device. Alternatively, the communication interface 240 may be used to inform the cause of the fault in the product 150, and/or a need for the preventive maintenance. The device 110 is also configured to provide the stored abnormal parameter values upon request of a user by utilizing the communication interface 240. In an example, the device 110 may also act as an independent watch-dog to the product 150.

Various components of the device 110 may be coupled by a centralized circuit system such as a bus 260. These components (210-250) may communicate to each other via the bus 260 to perform monitoring and diagnosis of faults in the product 150. The bus 260 may be various communication channels configured to, among other things, provide or enable communication between the components (210-250) of the device 110. In certain embodiments, the bus 260 may be configured in a central printed circuit board such as a motherboard, main board, system board, or logic board. Examples of the bus 260 may include a Peripheral Component Interconnect (PCI) bus, Embedded PCI (ePCI) bus, Compact PCI (cPCI), PCI-extended (PCI-X) bus, PCI express bus, VME bus VMX bus, any bus for industrial application such as PC applications, inter-Integrated Circuit ($I^2C$) Bus, USB, or any low cost Serial Peripheral Interface (SPI) bus.

It should be understood, however, that the product 150 and the device 110 as illustrated and described in reference to FIG. 2 are merely illustrative, and therefore, should not be taken to limit the scope of the embodiments of the present disclosure. As such, it should be appreciated that at least some of the components described above in connection with the device 110 may be optional, and thus certain embodiments of the device 110 may include more, less or different components than those described in connection with the example embodiment of FIG. 2.

Figure 3:
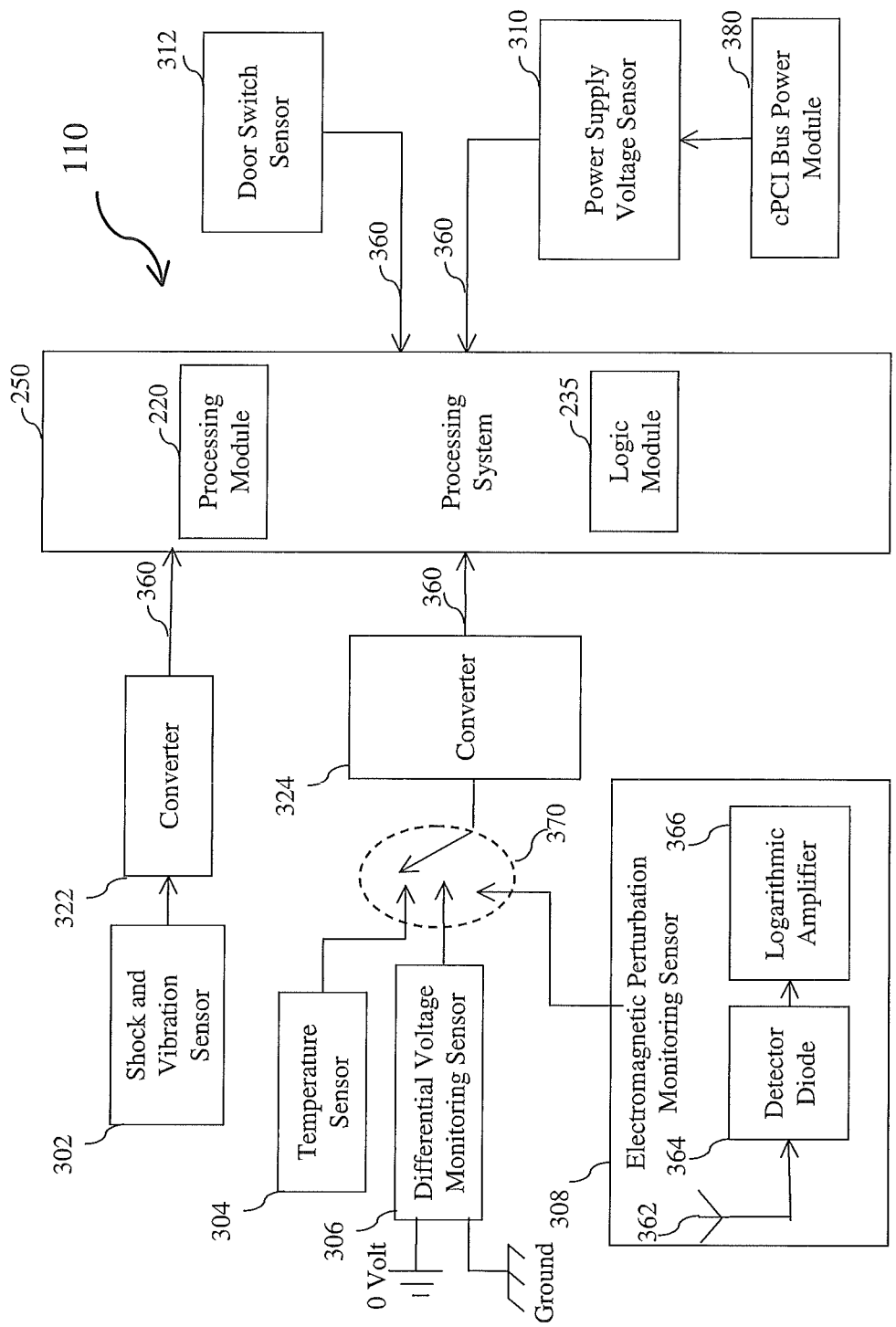
FIG. 3 illustrated block diagram representation of an implementation of the device, in accordance with an exemplary embodiment of the present disclosure.

Referring now to FIG. 3, an exemplary block diagram representation of the device 110 is shown, in accordance with another embodiment. In this exemplary embodiment of FIG. 3, the device 110 includes sensors such as 302, 304, 306, 308, 310 and 312 coupled to the processing system 250.

The sensors 302, 304, 306, 308, 310 and 312 may be examples of the sensors 210 of FIG. 2.

As shown in FIG. 3, the sensor 302 is a shock and vibration sensor configured to detect shock and vibration parameter in the cubicle where a product such as the product 150 is deployed. The shock and vibration sensor 302 is an analogue sensor that detects the value of the shock and vibration in a continuous manner. A converter 322 (for example, an ADC) is coupled with an output of the shock and vibration sensor 302 for receiving the analogue signals detected by the shock and vibration sensor 302. The converter 322 is configured to change the analogue signals into digital signals (or values). An output of the converter 322 is coupled with the processing system 250 by an inter-Integrated Circuit ($I^2C$) bus 360, and the digital values corresponding to the sensed shock and vibration parameter is communicated to the processing system 250. The processing system 250 also includes the logic module 235 to control the operation of the shock and vibration sensor 302 and the converter 322. In some examples, the shock and vibration sensor 302 and the converter 322 may be a single module. In some examples, the converter 322 is configured in the processing system 250.

As shown in FIG. 3, some parameters are monitored at periodic intervals. For examples, a converter 324 is configured to receive the analogue signals sensed by the sensors 304, 306 and 308. For instance, the sensor 304 is a temperature sensor, the sensor 306 is a differential voltage monitoring sensor for sensing the difference between 0V and ground potential, and the sensor 308 is an Electro-magnetic (EMC) perturbation monitoring sensor for measuring electro-magnetic perturbation in the vicinity (for example, the cubicle) of the product 150. The temperature sensor 304 may be an analogue sensor for measuring the ambient temperature where the product 150 is deployed. The sensor 306 may be an analogue sensor for measuring the difference between 0 volt and the ground potential. Further, the sensor 308 includes a track antenna 362 (i.e., an example of the printed antenna 245), a detector diode 364 and a logarithmic amplifier 366. The logarithmic amplifier 366 is electrically connected to the detector diode 364 and is configured to generate a range of signals based on signals received at the track antenna 362. The track antenna 362 may be configured on a PCB in the hosting module such as the hosting module 120. As shown in FIG. 3, the converter 324 is coupled to the outputs of the sensors 304, 306 and 308 through a switch 370 to accept analogue signals from the sensors 304, 306 and 308 in a periodic manner. The processing module 220 embodied in the processing system 250 may be configured to determine abnormal parameter conditions based on analyzing the digital values received from the converter 324.

The sensor 310 represents a power supply voltage sensor. As shown in the exemplary embodiment of FIG. 3, the sensor 310 senses the power supply received from a cPCI bus power module 380. The cPCI bus power module 380 includes power rails of 3.3 V, 5 V and ±12 V. The power supply voltage sensor 310 may be a digital sensor and is configured to continuously monitor the power rails of 3.3 V, 5 V and ±12 V received from the cPCI bus power module 380. It should be noted that cPCI bus power module 380 is shown for exemplary purposes only, and other power sources associated with PCI, PCI-extended (PCI-X), PCI express, VME, SATA, and Integrated Drive Electronics (IDE), may also be used. Further, the sensor 312 is a door switch sensor (a digital sensor), and is configured to detect whether one or more cubicle doors are closed or not where the product 150 is deployed. The digital values sensed by the sensors 310 and 312 are provided to the processing module 220, which may determine any abnormal parameter conditions associated with these parameters.

Figure 4:
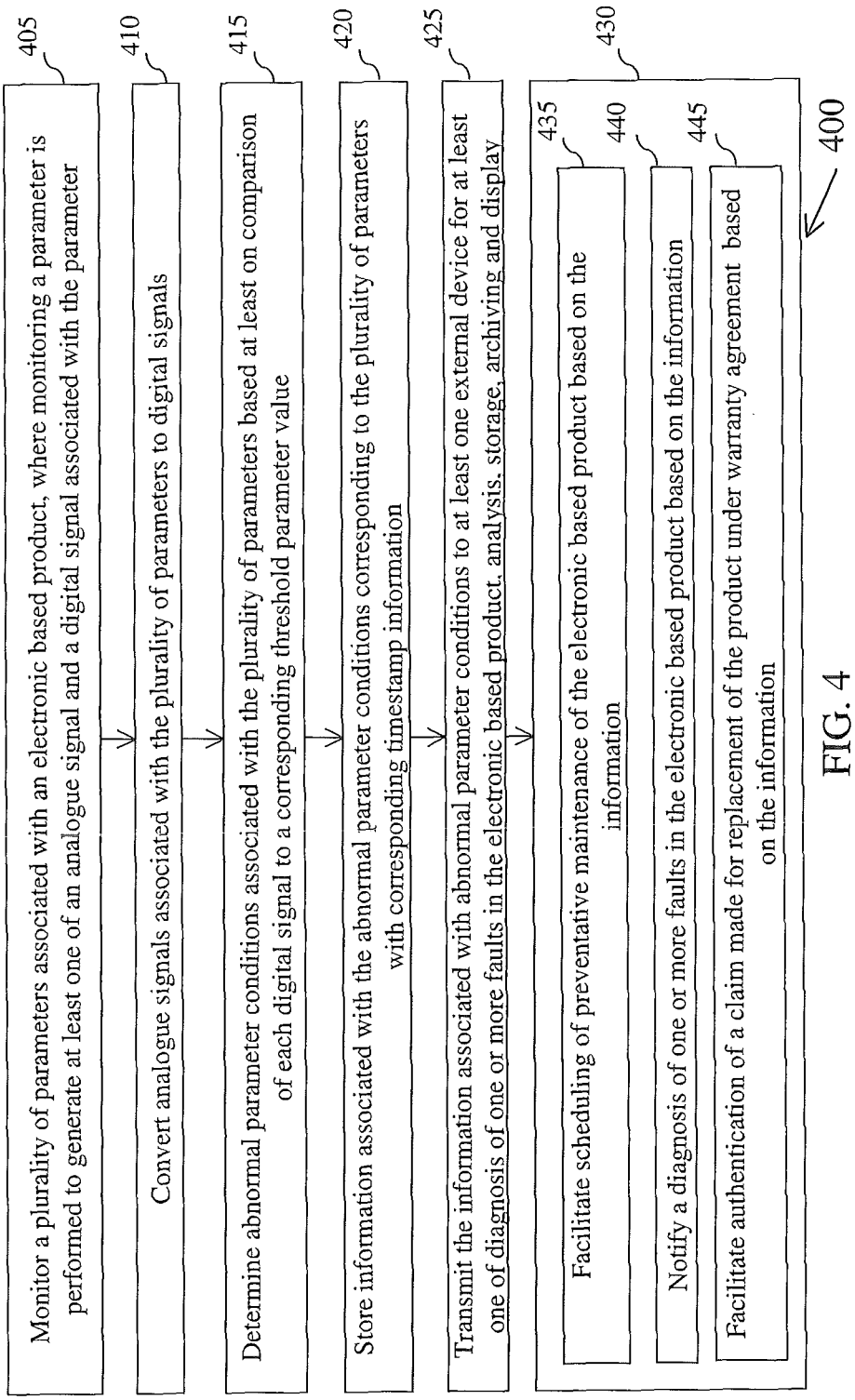
FIG. 4 is a flowchart depicting an example method for monitoring and diagnosis of an electronic based product, in accordance with an exemplary embodiment of the present disclosure.

FIG. 4 is a flowchart depicting a method 400 for diagnosis of an electronic based product in accordance with an exemplary embodiment of the present disclosure. The method 400 depicted in the flow chart may be executed by a device, for example, the device 110 of FIGS. 2 and 3. Operations of the flowchart, and combinations of operation in the flowchart, may be implemented by various means, such as hardware, firmware, computing device, circuitry and/or other device associated with execution of software including one or more computer program instructions. To facilitate discussions of the method 400 of FIG. 4, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Further, certain operations of the method 400 may be optional. Moreover, certain operations of the method 400 are performed in an automated fashion. These operations involve substantially no interaction with the user. Other operations of the methods 400 may be performed by in a manual fashion or semi-automatic fashion. These operations involve interaction with the user via one or more user interface presentations.

At 405, the method 400 includes monitoring a plurality of parameters associated with an electronic based product such as the product 150. In an example, monitoring of a parameter is performed to generate at least one of an analogue signal and a digital signal associated with the parameter. For example, the parameter may be monitoring by one of an analogue sensor or a digital sensor to generate one of the analogue signal or digital signal, respectively. Examples of the parameters are provided with reference to FIG. 1.

At 410, the method 400 includes converting analogue signals associated with the plurality of parameters to digital signals. As described in references to FIGS. 2 and 3, converters such as ADCs may be used to convert the analogue signals to the digital signals. In an example, some parameters may be monitored by digital sensors, and hence digital signals are already available corresponding to such monitoring of the parameters.

At 415, the method 400 includes determining abnormal parameter conditions associated with the plurality of parameters based at least on comparison of each digital signal to a corresponding threshold parameter value. As described in reference to FIG. 2, a processing module such as the processing module 220 is configured to determine the abnormal parameter conditions based on comparing digital signal associated with a parameter to a threshold parameter value corresponding to the parameter. For instance, if a digital signal associated with the ambient temperature parameter represent an ambient temperature of 392 Fahrenheit (° F.), and if the threshold parameter value for the ambient temperature is 280° F., the measurement of 392° F. is determined as an abnormal parameter value and hence the abnormal parameter condition is determined. Similarly, other digital signals associated with the various parameters are compared against their corresponding threshold parameter values to determine the abnormal parameter conditions.

In some embodiments, the method 400 may also include determining the abnormal parameter condition based on one or more of comparison of the digital signals to the threshold values, abnormal gradients, abnormal combination of the digital signals, and internally computed values (from a set of sensors, a mathematical model and/or a math analytical computation), as described in reference to FIG. 2.

At 420, the method 400 includes storing information associated with the abnormal parameter conditions in a memory such as the memory module 225. In an example, the information may include the monitored digital signals which are abnormal parameter values. However, in some examples, the monitored digital signals that are not abnormal parameter values may also be stored for the record purposes. In an example, the memory may be a part of the product 150. In another example, the memory may be a non-volatile memory configured in the electronic based product. The information such as the abnormal parameter values may be stored for a longer period of time and may be made available upon a user request. In an example, storing the abnormal parameter values also includes storing timestamp information associated with the occurrence of the abnormal parameter values. For example, if the abnormal parameter value (for example, 390° F.) corresponding to the ambient temperature is determined at a time of 7:30 PM on 12 Jul. 2013, this timestamp information may be stored with the abnormal parameter value corresponding to the ambient temperature.

At 425, the method 400 includes transmitting the information associated with the abnormal parameter conditions to at least one external device at least for diagnosis of one or more faults in the electronic based product. In some embodiments, the information may also be transmitted for the purposes of storage, archiving and displays of the information. In an example, the external device may be a communication device of a maintenance engineer who can perform repairing/maintenance of the electronic based product. Alternatively or additionally, the external device may be a local PC, station (for example, a USB key, a USB disk, a PC, a tablet, a smart phone, a pocket terminal), a central control station where the information pertaining to various site conditions/are received, analysed, stored, archived and displayed (for example, information such as curves, historical representations, alarm list and the like may be displayed).

At 430, the method 400 provides at least one of performing steps 435, 440 and 445. It should be noted that one or more, or entire operations performed at 430 may be optional. At 435, the method 400 includes facilitating scheduling of preventative maintenance of the electronic based product based on the information associated with the abnormal parameter conditions. For instance, if the electronic based product is used in an ambient temperature (that is higher than the optimum specified ambient temperature) for a more than a threshold time duration, a notification may be generated for switching ON a cooling system, switching OFF the electronic based product for a pre-determined duration, or notification may be generated to deploy other means for lowering the ambient temperature of the electronic based product. Further, if the pollution level becomes higher than the threshold level, a notification may be generated for the preventive maintenance such as cleaning or changing filters present in the electronic based device, performing air conditioning maintenance, and repairing any leaks in circuit(s) in the electronic based product or its environment.

At 440, the method 400 includes notifying a caused of fault in the electronic based product based on the information associated with the abnormal parameter conditions. As abnormal parameter values corresponding to various parameters are time tagged, an occurrence of a fault in the electronic based product may be precisely linked to one or more parameters. For example, a timestamp information associated with an abnormal parameter conditions may be matched to a time of occurrence of the fault in the electronic based product to diagnose a parameter (corresponding to the abnormal parameter condition) that has caused the fault.

Further, at 445, the method 400 includes facilitating authentication of a claim made for replacement or repair of the electronic based product under warranty agreement. If the electronic based product is used in out of rated operating conditions (as per the product specifications), some abnormal parameter conditions corresponding to one or more parameters are automatically stored in the device along with corresponding timestamp information. Accordingly, if it is determined that the electronic based product has been used under out of rated operating conditions, a claim made under warranty agreement for the replacement of the electronic based product may be rejected.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

The invention claimed is:

1. A device for diagnosis of an electronic component of an industrial plant, the device comprising:
   a plurality of sensors coupled with the electronic component for monitoring a plurality of parameters associated with the electronic component, each sensor configured to generate at least one of an analogue signal and a digital signal upon monitoring of a parameter;
   a plurality of converters coupled to the plurality of sensors for converting analogue signals generated from the plurality of sensors to digital signals;
   a processing module coupled with the plurality of converters for determining abnormal parameter conditions based at least on comparing the digital signals to threshold parameter values, each abnormal parameter condition corresponding to a parameter being determined based on comparison of a digital signal associated with the parameter and a threshold parameter value corresponding to the parameter;
   a memory module coupled with the processing module, the memory configured to store information associated with the abnormal parameter conditions and timestamp information associated with each of the abnormal parameter conditions; and
   a communication interface configured to provide the information associated with the abnormal parameter conditions to at least one external device for diagnosis of one or more faults in the electronic component,
   wherein the device is integrated in a hosting module of the electronic component, and
   wherein the processing module is configured to determine the abnormal parameter conditions associated with the plurality of parameters by: (i) computing a time duration associated with at least one parameter, (ii) counting a number of occurrences of at least one parameter, and (iii) computing a mathematical modeling associated with a parameter based on at least one of the time duration associated with the parameter, the number of occurrences of the parameter and historical information associated with the parameter.

2. The device as claimed in claim 1, further comprising a processing system comprising one or more logic modules for controlling the plurality of sensors and the plurality of converters.

3. The device as claimed in claim 2, wherein the processing module is configured in the processing system.

4. The device as claimed in claim 1, wherein a processing system is at least one of an Application Specific Integrated Circuit (ASIC), a System on Chip (SOC), a micro-controller, a Digital Signal Procession (DSP), an Electrically Programmable Logic Device (EPLC), Complex Programmable Logic Device (CPLD) and a Field Programmable Gate Array (FPGA) system.

5. The device as claimed in claim 1, wherein the hosting module is at least one of a circuit board of the electronic component, a backplane of the electronic component, a Central Processing Unit (CPU) of the electronic component and an Input/Output (I/O) module of the electronic component, partially or completely ensured by one or more parts of the electronic component, a single board of the electronic component, a main board of the electronic component and a daughter board of the electronic component.

6. The device as claimed in claim 1, wherein the plurality of parameters comprises: a voltage difference between 0 Volt and ground potential; an ambient temperature where the electronic component is deployed; accelerations, shocks and vibrations associated with components of the electronic component; shocks and vibration on a cubicle where the electronic component is deployed; power supply fed to the electronic component; electro-magnetic perturbation in an ambience of the electronic component; and opening/closing of one or more doors of the cubicle, temperature of the electronic component; humidity in ambience of the electronic component; pressure; altitude; angle of orientation from vertical and horizontal; geo-localization; light and brightness level; noise level; radiations level; pollution level; gas presence level in the ambience; fumes and particles presence level in the ambience; number of transitions and duration of ON/OFF of the power supply; and logic inputs to monitor one or more subjects placed in proximity to the electronic component.

7. The device as claimed in claim 1, wherein the external device is at least one a communication device and a control station.

8. The device as claimed in claim 1, wherein the processing module is further configured to determine the abnormal parameter condition based on at least one of a comparison of the digital signals to the threshold parameter values, the time duration associated with at least one parameter, the number of occurrences of at least one parameter, and the mathematical modelling.

9. The device as claimed in claim 1, further comprising a printed antenna configured to detect signals corresponding to an electro-magnetic perturbation for monitoring of an electro-magnetic perturbation parameter.

10. A method performed a device for diagnosis of an electronic component of an industrial plant, the method comprising:
    monitoring, by a plurality of sensors of the device, a plurality of parameters associated with the electronic component, wherein monitoring a parameter is performed to generate at least one of an analogue signal and a digital signal associated with the parameter;

converting, by a plurality of converters of the device, analogue signals associated with the plurality of parameters to digital signals;

determining, by a processing module of the device, abnormal parameter conditions associated with the plurality of parameters based at least on comparing the digital signals to threshold parameter values, each abnormal parameter condition corresponding to a parameter being determined based at least on comparison of a digital signal associated with the parameter and a threshold parameter value corresponding to the parameter;

storing, by a memory module of the device, information associated with the abnormal parameter conditions corresponding to the plurality of parameters for diagnosis of one or more faults in the electronic component, storing, by the memory module of the device, timestamp information associated with each abnormal parameter condition;

computing, by the processing module, a time duration associated with at least one parameter;

counting, by the processing module, a number of occurrences of at least one parameter; and computing, by the processing module, a mathematical modeling associated with a parameter based on at least one of the time duration associated with the parameter, the number of occurrence of the parameter and historical information associated with the parameter, wherein the determination of the abnormal parameter conditions associated with the plurality of parameters is based on at least one of computing a time duration, counting a number of occurrences, and computing a mathematical modeling, and wherein the device is integrated as part of a hosting module of the electronic component.

11. The method as claimed in claim 10, further comprising:

transmitting the information associated with the abnormal parameter conditions to at least one external device for at least one of the diagnosis of the one or more faults in the electronic component, storage, archiving and displays of the information.

12. The method as claimed in claim 10, further comprising at least one of:

facilitating scheduling of preventative maintenance of the electronic component based on the information associated with the abnormal parameter conditions;

notifying a diagnosis of a fault in the electronic component based on the information associated with the abnormal parameter conditions; and facilitating authentication of a claim made for replacement of the electronic component under a warranty agreement based on the information associated with the abnormal parameter conditions.

13. The method as claimed in claim 10, wherein the plurality of parameters comprises: a voltage difference between 0 Volt and ground potential; an ambient temperature where the electronic component is deployed; accelerations, shocks and vibrations associated with components of the electronic component; shocks and vibration on a cubicle where the electronic component is deployed; power supply fed to the electronic component; electro-magnetic perturbation in an ambience of the electronic component; and opening/closing of one or more doors of the cubicle; temperature of the electronic component; humidity in ambience of the electronic component; pressure; altitude; angle of orientation from vertical and horizontal; geo-localization; light and brightness level; noise level; radiations level; pollution level; gas presence level in the ambience; fumes and particles presence level in the ambience; number of transitions and duration of ON/OFF of the power supply; and logic inputs to monitor one or more subjects placed in proximity to the electronic component.

14. The method as claimed in claim 10, wherein the hosting module is one of a circuit board of the electronic component, a backplane of the electronic component, a Central Processing Unit (CPU) of the electronic component and an Input/Output (I/O) module of the electronic component.

* * * * *